(12) United States Patent
Li

(10) Patent No.: US 11,113,224 B2
(45) Date of Patent: Sep. 7, 2021

(54) DISPLAY DRIVER BOARD WITH MULTIPLE TYPE-C FULL-FUNCTION INTERFACES

(71) Applicant: SHENZHEN PARAMOUNT TECHNOLOGY CO., LTD, Shenzhen (CN)

(72) Inventor: Jie Li, Fuyang (CN)

(73) Assignee: SHENZHEN PARAMOUNT TECHNOLOGY CO., LTD, Shenzhen (CN)

(*) Notice: Subject to any disclaimer, the term of this patent is extended or adjusted under 35 U.S.C. 154(b) by 160 days.

(21) Appl. No.: 16/458,549

(22) Filed: Jul. 1, 2019

(65) Prior Publication Data
US 2020/0242064 A1 Jul. 30, 2020

(30) Foreign Application Priority Data
Jan. 26, 2019 (CN) .......................... 201910076391.8
Jan. 26, 2019 (CN) .......................... 201920149993.7

(51) Int. Cl.
| | |
|---|---|
| *G06F 13/40* | (2006.01) |
| *G06F 13/38* | (2006.01) |
| *G09G 5/00* | (2006.01) |

(52) U.S. Cl.
CPC ........ *G06F 13/4022* (2013.01); *G06F 13/385* (2013.01); *G09G 5/006* (2013.01); *G06F 2213/0042* (2013.01); *G06F 2213/3812* (2013.01); *G06F 2213/4004* (2013.01); *G09G 2330/00* (2013.01); *G09G 2352/00* (2013.01)

(58) Field of Classification Search
CPC ............... G06F 13/385; G06F 13/4022; G06F 2213/0042; G06F 2213/3812; G06F 2213/4004; G09G 5/006; G09G 2330/00; G09G 2352/00
USPC .............................. 345/1, 211, 212, 213, 214
See application file for complete search history.

(56) References Cited

U.S. PATENT DOCUMENTS

| | | | |
|---|---|---|---|
| 10,708,541 B2 * | 7/2020 | Chen | ...................... H04N 7/104 |
| 2016/0156137 A1 * | 6/2016 | Pan | ....................... G06F 13/385 |
| | | | 439/78 |
| 2017/0046289 A1 * | 2/2017 | Hundal | ............... G06F 13/4022 |
| 2020/0151129 A1 * | 5/2020 | Wright | .................. G06F 13/385 |

* cited by examiner

*Primary Examiner* — Jason M Mandeville
(74) *Attorney, Agent, or Firm* — Li & Cai Intellectual Property (USA) Office

(57) ABSTRACT

The present invention discloses a display driver board with multiple TYPE-C full-function interfaces, including a first TYPE-C interface and a second TYPE-C interface, where the two TYPE-C interfaces are connected to a first connection device, a second connection device, a PD power control circuit, a protocol chip, a display signal processing circuit, and a USB HUB chip, respectively; the PD power control circuit is connected to a system power supply and the protocol chip; and the protocol chip is connected to forward/reverse insertion control signal ends of the first and second SWITCH chips, respectively.

5 Claims, 14 Drawing Sheets

DISPLAY DRIVER BOARD WITH MULTIPLE TYPE-C FULL-FUNCTION INTERFACES

TECHNICAL FIELD

The present invention relates to the field of electronic products, and in particular, to a display driver board with multiple TYPE-C full-function interfaces.

BACKGROUND

A display driver board is an interface card for connecting a host to a display screen, and has a function of converting output information of the host into information such as characters, graphics and colors and transmitting to the display screen for display. The display driver board currently available on the market has no dual USB-C (TYPE-C) full-function interface, which is inconvenient for some mobile display screens and cannot meet use requirements of people.

SUMMARY

Regarding the foregoing problem, an objective of the present invention is to provide a display driver board with multiple TYPE-C full-function interfaces that is simple in structure and convenient in use.

To achieve the foregoing objective, the present invention adopts the following technical solution:

A display driver board with multiple TYPE-C full-function interfaces, including a first TYPE-C interface and a second TYPE-C interface, where signal input ends of the first TYPE-C interface and the second TYPE-C interface are connected to signal output ends of a first connection device and a second connection device, respectively; power ends of the first TYPE-C interface and the second TYPE-C interface are bidirectionally connected to a PD power control circuit, and the PD power control circuit is bidirectionally connected to a system power supply through a DC-DC converter; a control signal input end of the PD power control circuit is connected to a control signal output end of a protocol chip, and a CC signal connection end of the protocol chip is connected to CC signal connection ends of the first TYPE-C interface and the second TYPE-C interface through a communication control circuit, respectively; USB2.0 signal ends of the first TYPE-C interface and the second TYPE-C interface are bidirectionally connected to a signal input end of a USB port switch, and a signal output end of the USB port switch is connected to a plurality of USB interfaces through a USB HUB chip; output signal ends of the first TYPE-C interface and the second TYPE-C interface are connected to signal input ends of a first SWITCH chip and a second SWITCH chip, respectively; signal output ends of the first SWITCH chip and the second SWITCH chip are connected to a display signal processing circuit; a forward/reverse insertion control signal output end of the protocol chip is connected to forward/reverse insertion control signal input ends of the first SWITCH chip and the second SWITCH chip, respectively; and a selection control signal output end of the protocol chip is connected to a signal input end of the USB port switch.

Further, the PD power control circuit includes a first MOS transistor Q13 and a second MOS transistor Q12; a gate of the first MOS transistor Q13 is connected to one end of a resistor R33, and the other end of the resistor R33 is connected to a TYPEC0_VBUS terminal of the first TYPE-C interface; a gate of the second MOS transistor Q12 is connected to one end of a resistor R256, and the other end of the resistor R256 is connected to a TYPEC1_VBUS terminal of the second TYPE-C interface; a drain of the first MOS transistor Q13 is connected to a TYPEC0_VBUS DET terminal and one end of a resistor R254, respectively; a drain of the second MOS transistor Q12 is connected to a TYPEC1_VBUS DET terminal and one end of the resistor R256, respectively; and the other end of the resistor R254 and the other end of the resistor R256 are connected to the DC-DC converter; sources of the first MOS transistor Q12 and the second MOS transistor Q13 are grounded, respectively; and the first MOS transistor Q13 and the second MOS transistor Q12 are both 2N7002 in model.

Further, the DC-DC converter employs a buck DC-DC converter TD1583, and a SW terminal of the DC-DC converter TD1583 outputs 5V direct current.

Further, the communication control circuit includes a third MOS transistor and a fourth MOS transistor; drain terminals D1, D2, D3, and D4 of the third MOS transistor are connected to the TYPEC0_VBUS terminal of the first TYPE-C interface, drain terminals D1, D2, D3, and D4 of the fourth MOS transistor are connected to the TYPEC1_VBUS terminal of the second TYPE-C interface, and the third MOS transistor and the fourth MOS transistor are both 9435 in model.

Further, the display signal processing circuit includes a first display signal processing circuit and a second display signal processing circuit; the first display signal processing circuit includes a first capacitor C134 and a second capacitor C135; one end of the first capacitor C134 is connected to an AUXP-0 terminal of the first SWITCH chip, one end of a resistor R212, and one end of a resistor R913, respectively, and the other end of the first capacitor C134 is connected to an AUX-CHP-0 terminal of a display screen; the other end of the resistor R212 is connected to a 3V3-SYS terminal of the first SWITCH chip, and the other end of the resistor R913 is connected to a DP-SINK-ASS-P0 terminal of the display screen; one end of the second capacitor C135 is connected to an AUXN-0 terminal of the first SWITCH chip, one end of a resistor R221, and one end of a resistor R211, respectively, and the other end of the second capacitor C135 is connected to an AUX-CHN-0 terminal of the display screen; the other end of the resistor R221 is grounded, and the other end of the resistor R211 is connected to a DP-SINK-ASS-NO terminal of the display screen; the second display signal processing circuit includes a third capacitor C141 and a fourth capacitor C142; one end of the third capacitor C141 is connected to an AUXP-1 terminal of the second SWITCH chip, one end of a resistor R245, and one end of the resistor R244, respectively, and the other end of the third capacitor C141 is connected to an AUX-CHP-1 terminal of the display screen; the other end of the resistor R245 is connected to a 3V3-SYS terminal of the second SWITCH chip, and the other end of the resistor R244 is connected to a DP-SINK-ASS-P1 terminal of the display screen; one end of the fourth capacitor C142 is connected to an AUXN-1 terminal of the second SWITCH chip, one end of a resistor R246, and one end of a resistor R243, respectively, and the other end of the fourth capacitor C142 is connected to an AUX-CHN-1 terminal of the display screen; and the other end of the resistor R246 is grounded, and the other end of the resistor R243 is connected to a DP-SINK-ASS-N1 terminal of the display screen.

Compared with the prior art, the advantages and positive effects of the present invention are as follows:

The display driver board of the present invention has two full-function TYPE-C interfaces, which can both provide power, signals and USB2.0 "uplink port" or "downlink port" for the display screen. During use, when only one of the two TYPE-C interfaces is connected to a connection device, the protocol chip on the display driver board is connected to the connection device through the communication control circuit, and power is taken from the connection device. The display screen does not work if it fails in power taking, and the display screen is turned on if it succeeds in power taking, and is connected to the USB HUB chip by connecting the USB port switch, and multiple USB interfaces for data connection are expanded through the USB HUB chip. When the other TYPE-C interface is connected to a second connection device, the display driver board is connected to the second connection device through the communication control circuit to detect the power supply capability of the second connection device. If the power supply capability of the second connection device is greater than that of the first connection device, the second connection device supplies corresponding current to the system, and the first connection device is used as a data connection device. If the power supply capability of the second connection device is smaller than that of the first connection device, the second connection device is used as the data connection device. The present invention detects different connection devices through the TYPE-C interfaces, so that the display screens of televisions, mobile phones or tablet computers can be powered by the connection device as required, and the connection device with strong power supply capability is preferentially selected, and the device with weak power supply capability is charged, thereby improving the use effect of the present invention and bringing great convenience to people.

BRIEF DESCRIPTION OF DRAWINGS

To illustrate the technical solutions in embodiments of the present invention or the prior art more clearly, the drawings used in the description of the embodiments or the prior art are briefly described below. Apparently, the drawings in the following description are only some embodiments of the present invention, and those of ordinary skill in the art can obtain other drawings according to these drawings without involving any creative labor.

DESCRIPTION OF EMBODIMENTS

The technical solutions in the embodiments of the present invention are clearly and completely described below with reference to the drawings in the embodiments of the present invention. Apparently, the described embodiments are only a part of the embodiments of the present invention, but not all embodiments. All other embodiments and any modification, equivalent substitution, improvement, etc. obtained and made by those of ordinary skill in the art based on the embodiments of the present invention without involving any creative labor should fall within the scope of protection of the present invention.

Figure 1:
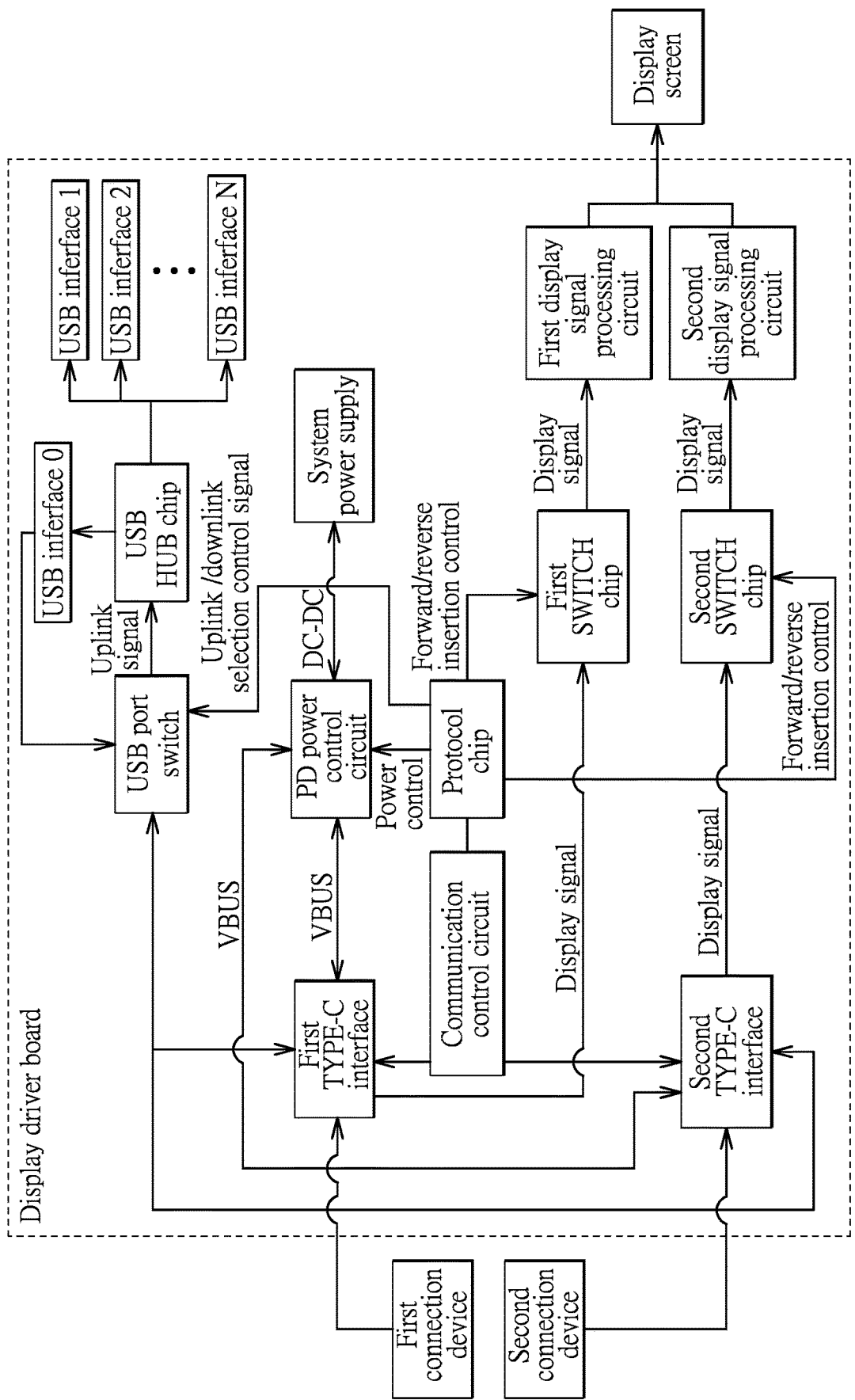
FIG. 1 is a frame structure diagram of the present invention.
Figure 2:
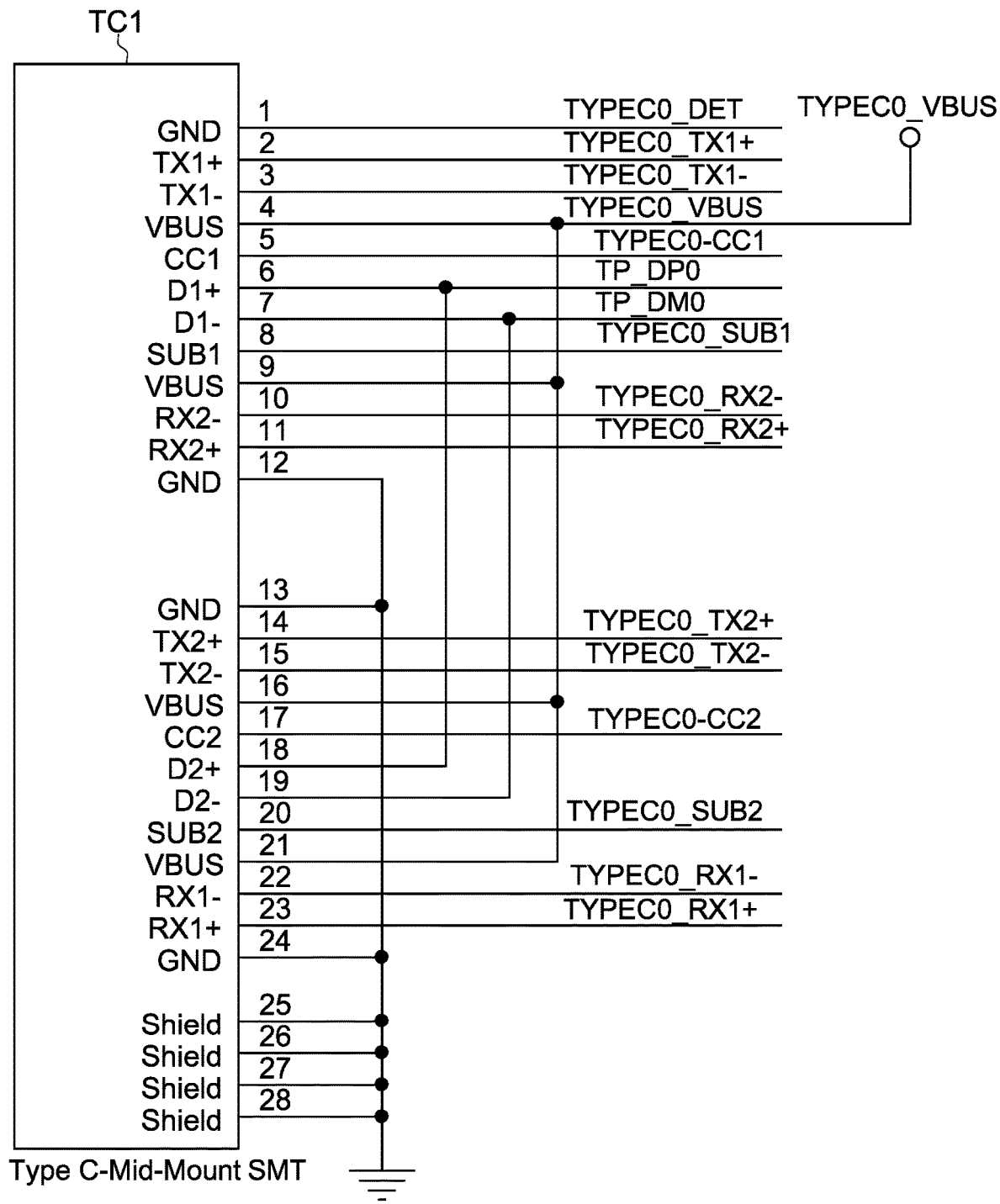
FIG. 2 is a pin connection diagram of a first TYPE-C interface.
Figure 3:
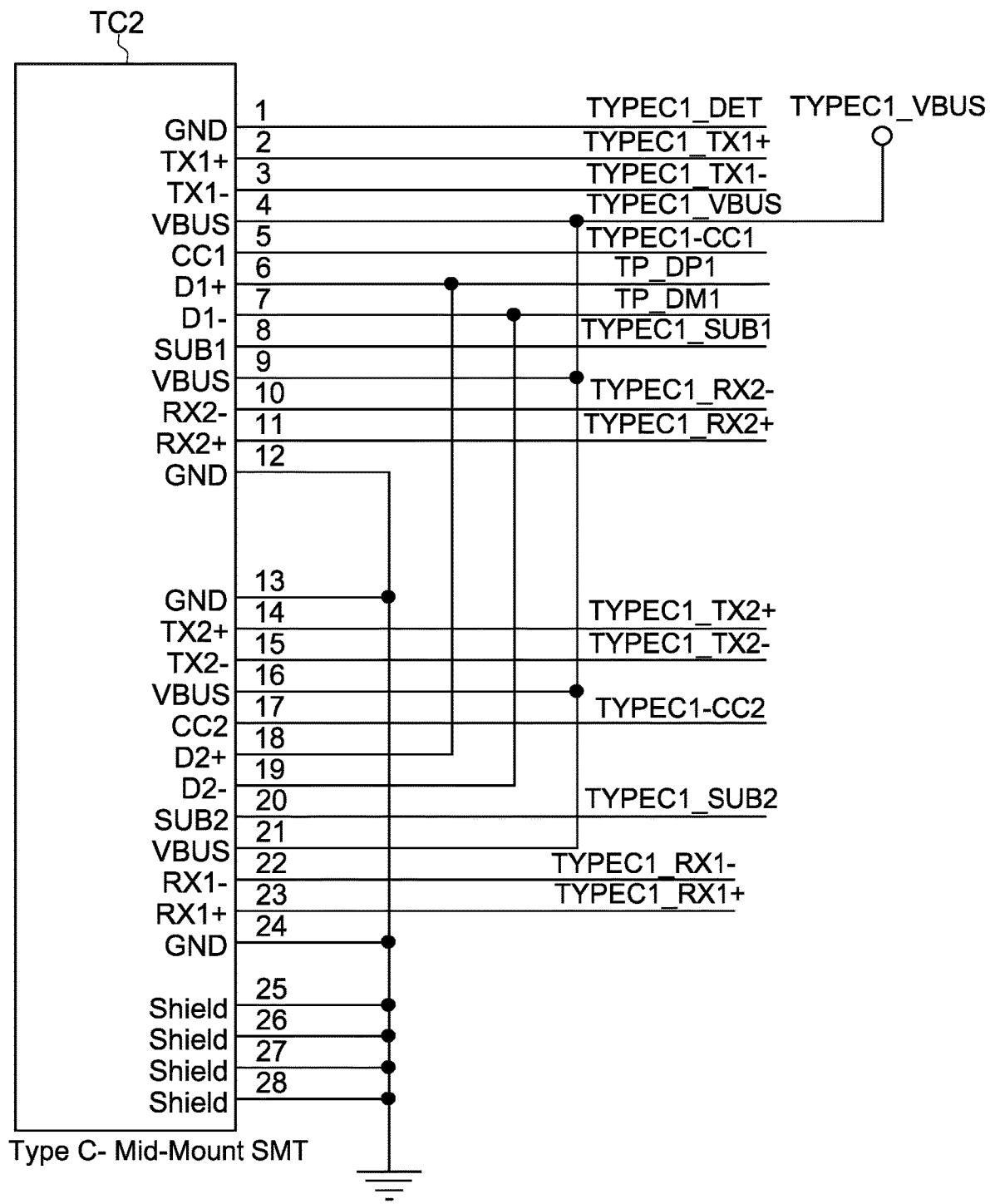
FIG. 3 is a pin connection diagram of a second TYPE-C interface.
Figure 4:
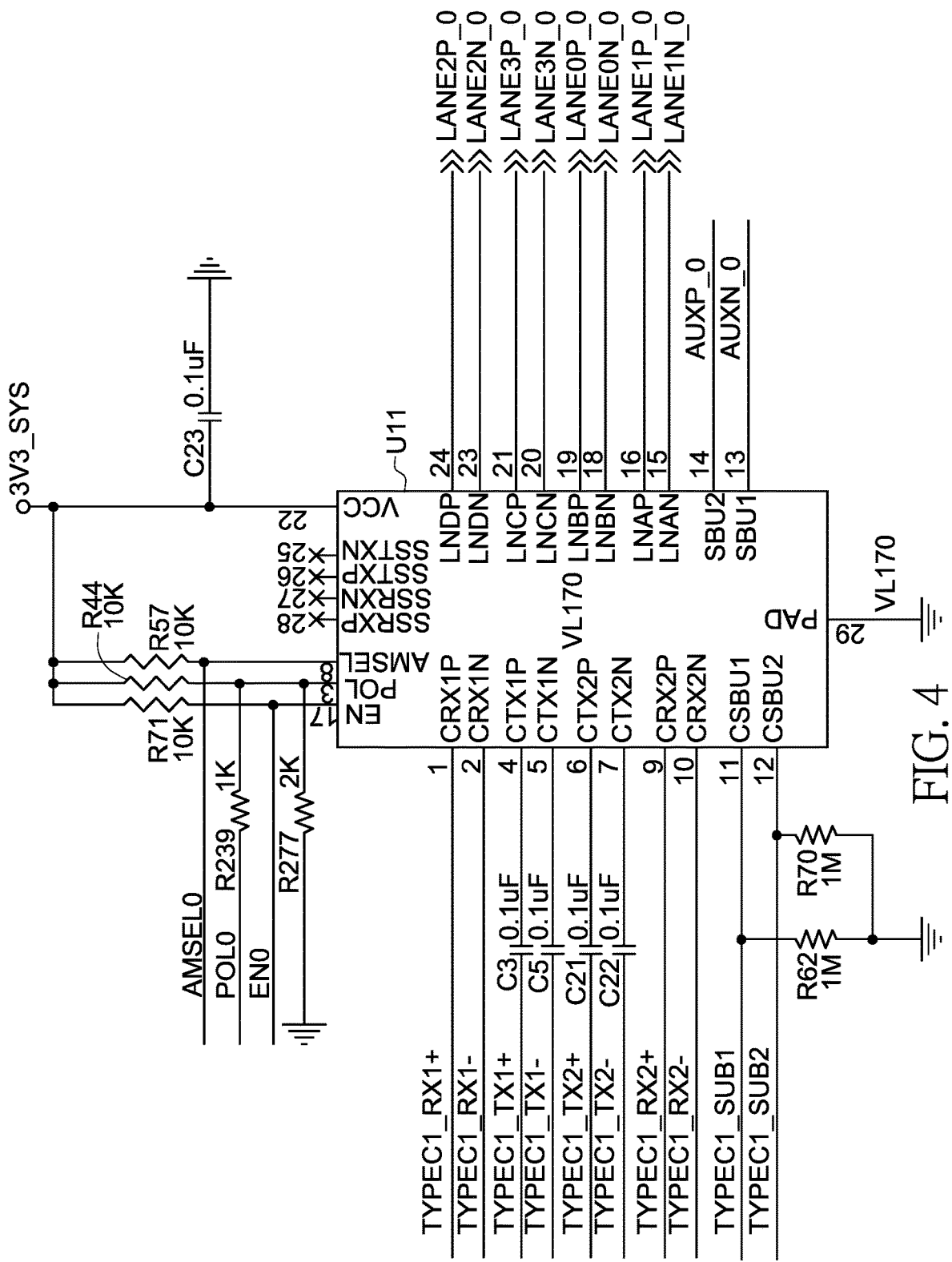
FIG. 4 is a pin connection diagram of a first SWITCH chip.
Figure 5:
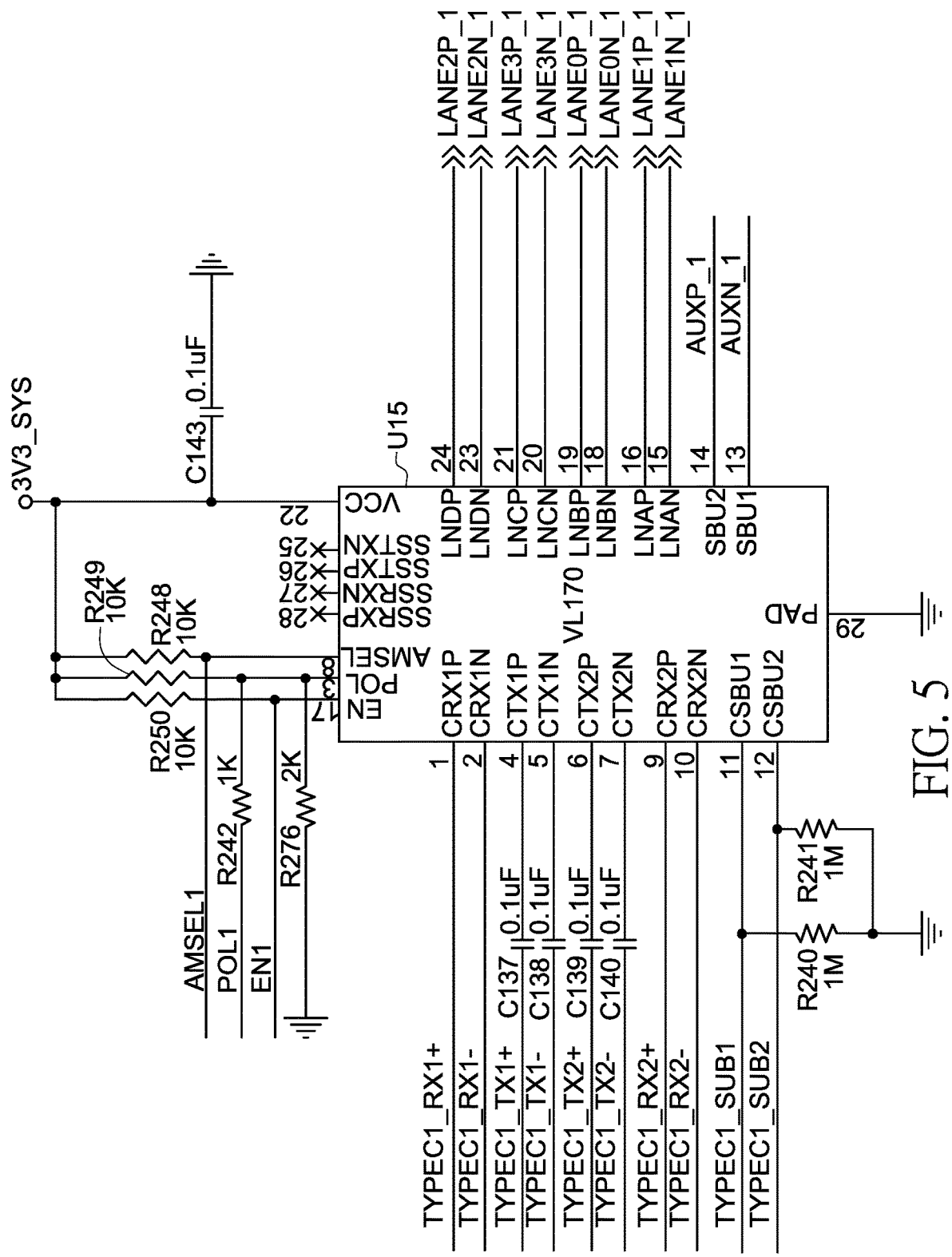
FIG. 5 is a pin connection diagram of a second SWITCH chip.
Figure 6:
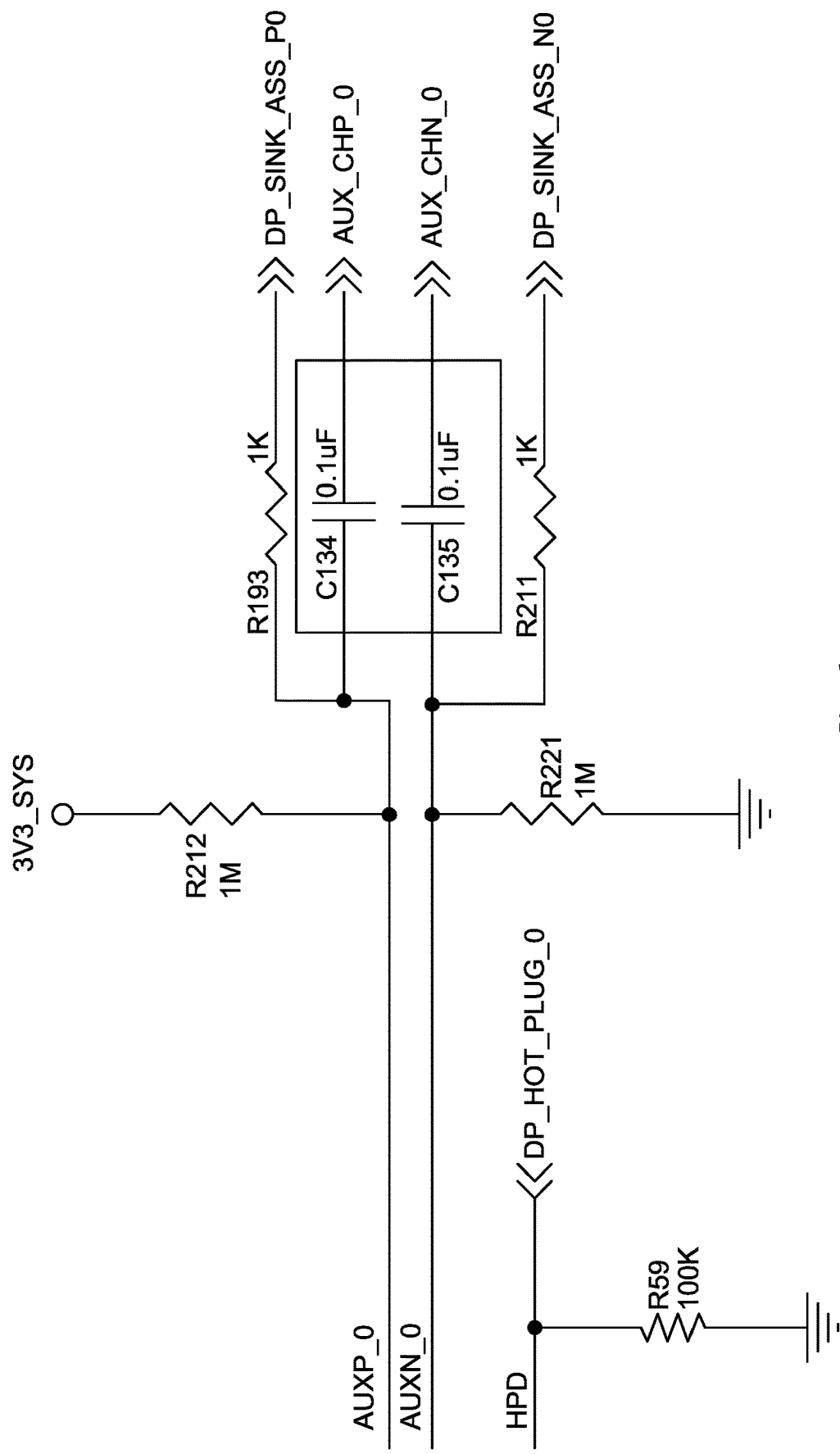
FIG. 6 is a circuit structure diagram of a first display signal processing circuit.
Figure 7:
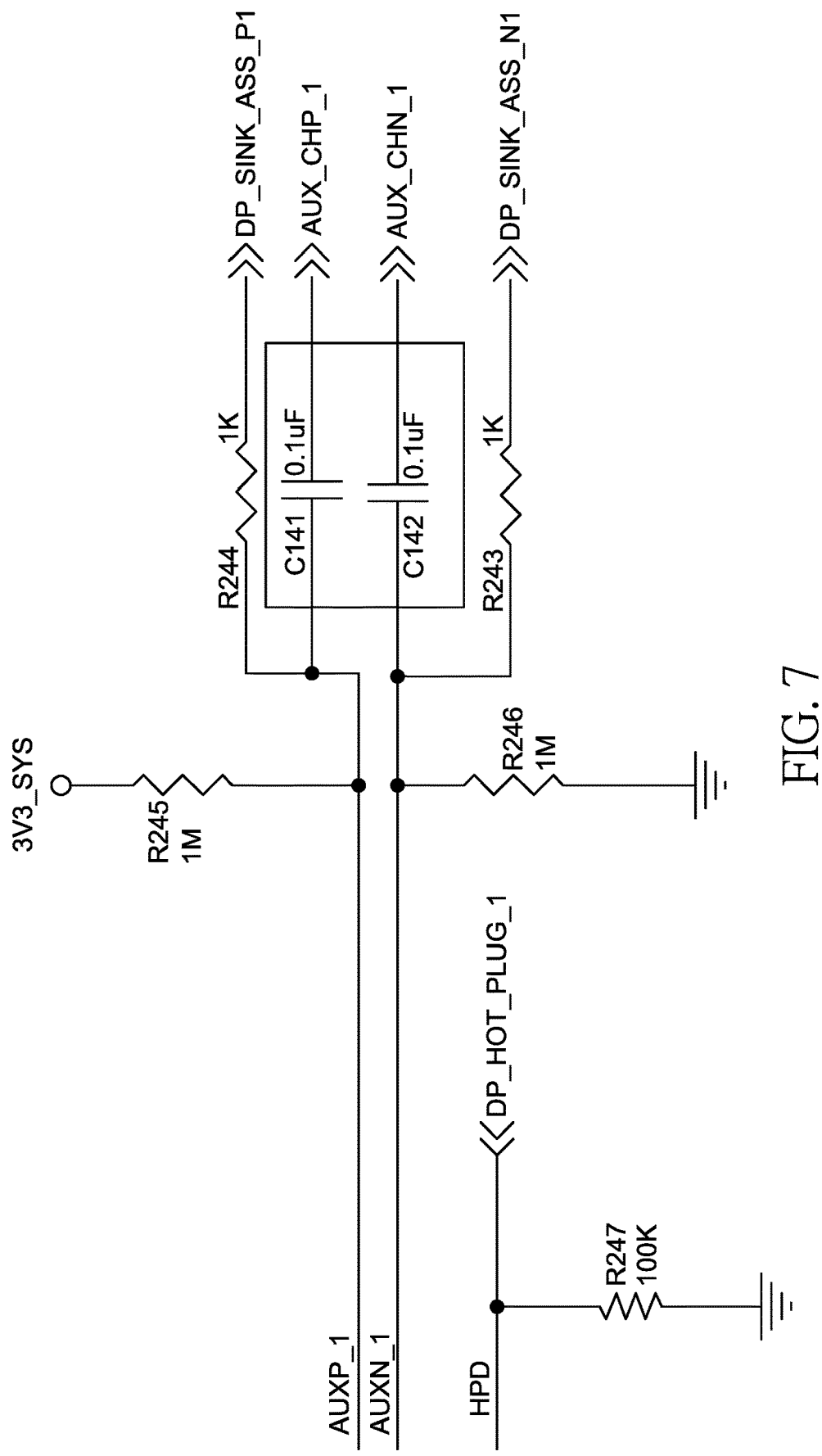
FIG. 7 is a circuit structure diagram of a second display signal processing circuit.
Figure 8:
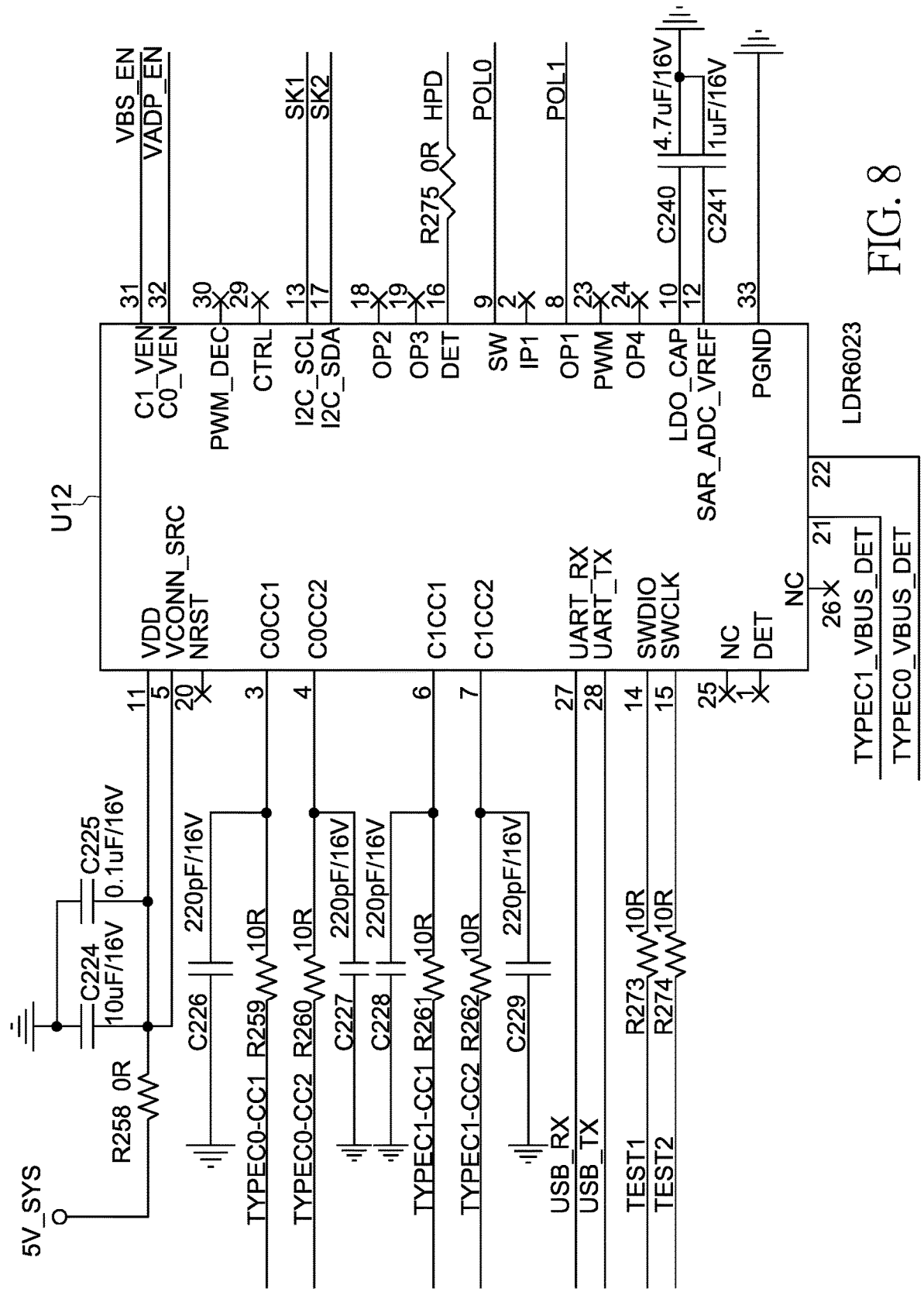
FIG. 8 is a pin connection diagram of a protocol chip.
Figure 9:
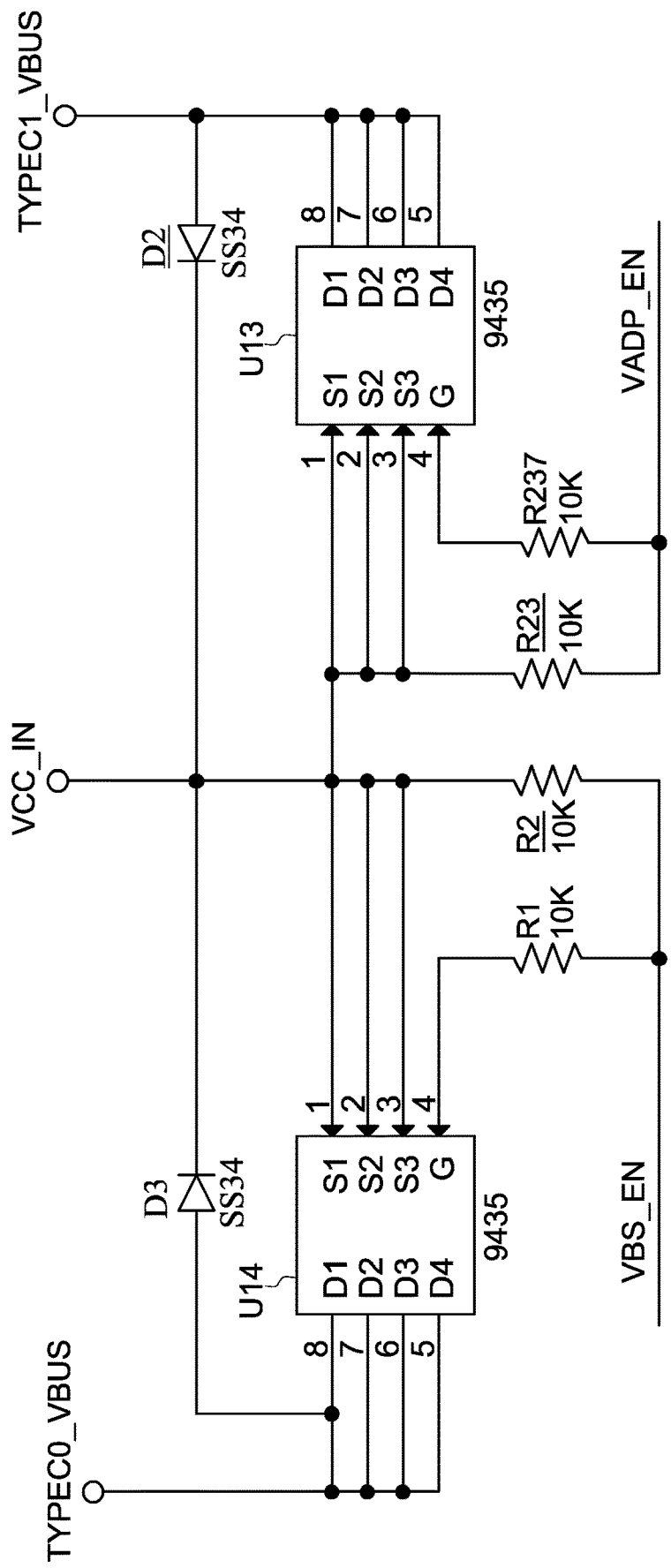
FIG. 9 is a circuit structure diagram of a communication control circuit.
Figure 10:
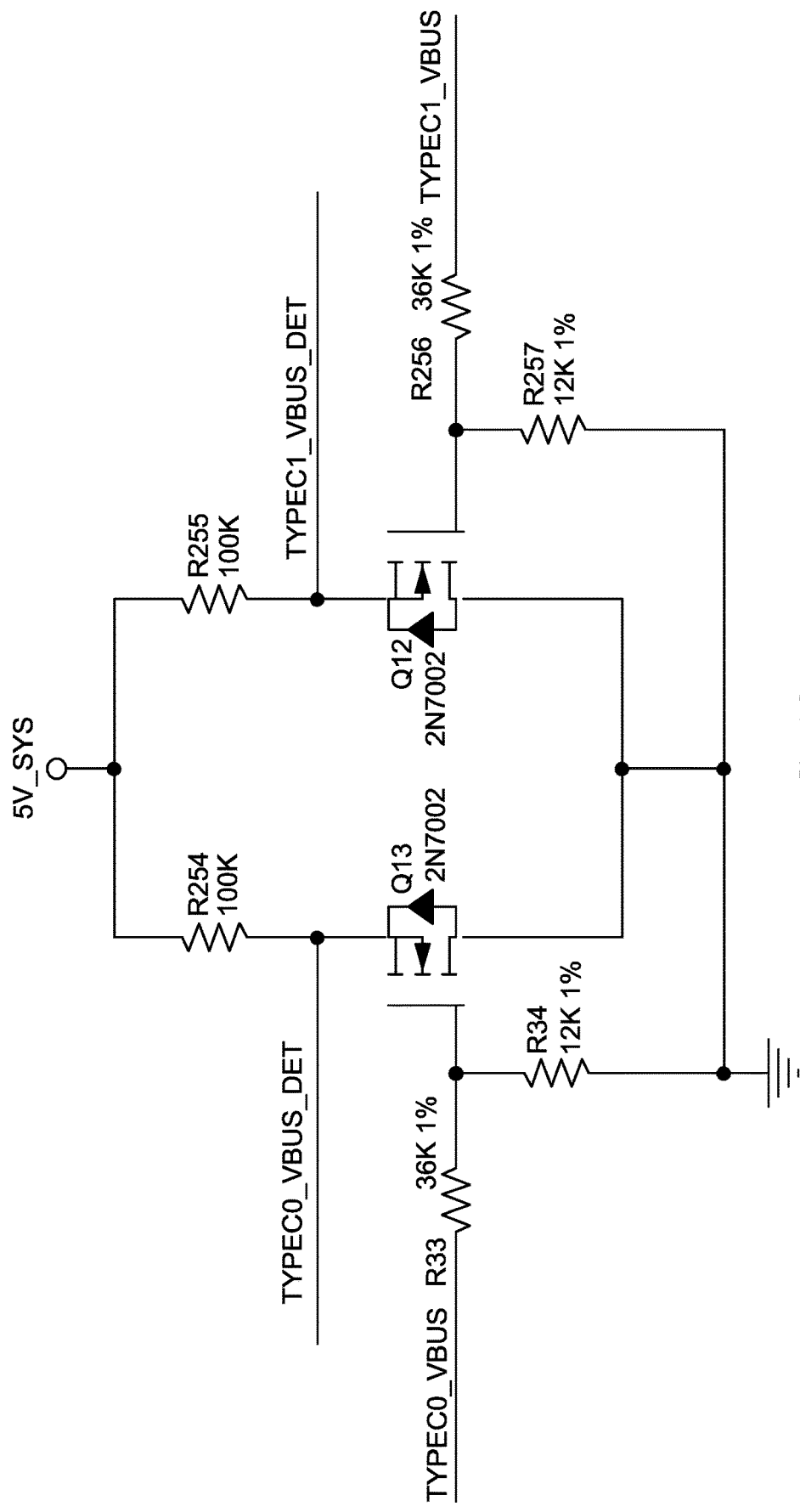
FIG. 10 is a circuit structure diagram of a PD power control circuit.
Figure 11:
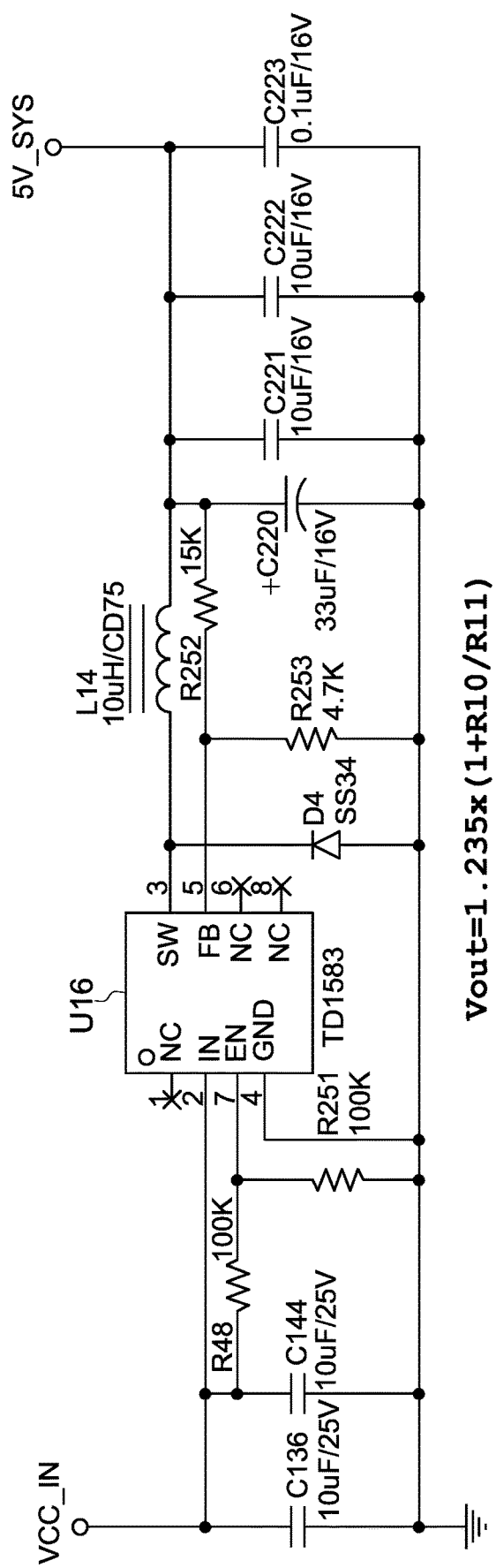
FIG. 11 is a pin connection diagram of a DC-DC converter.
Figure 12:
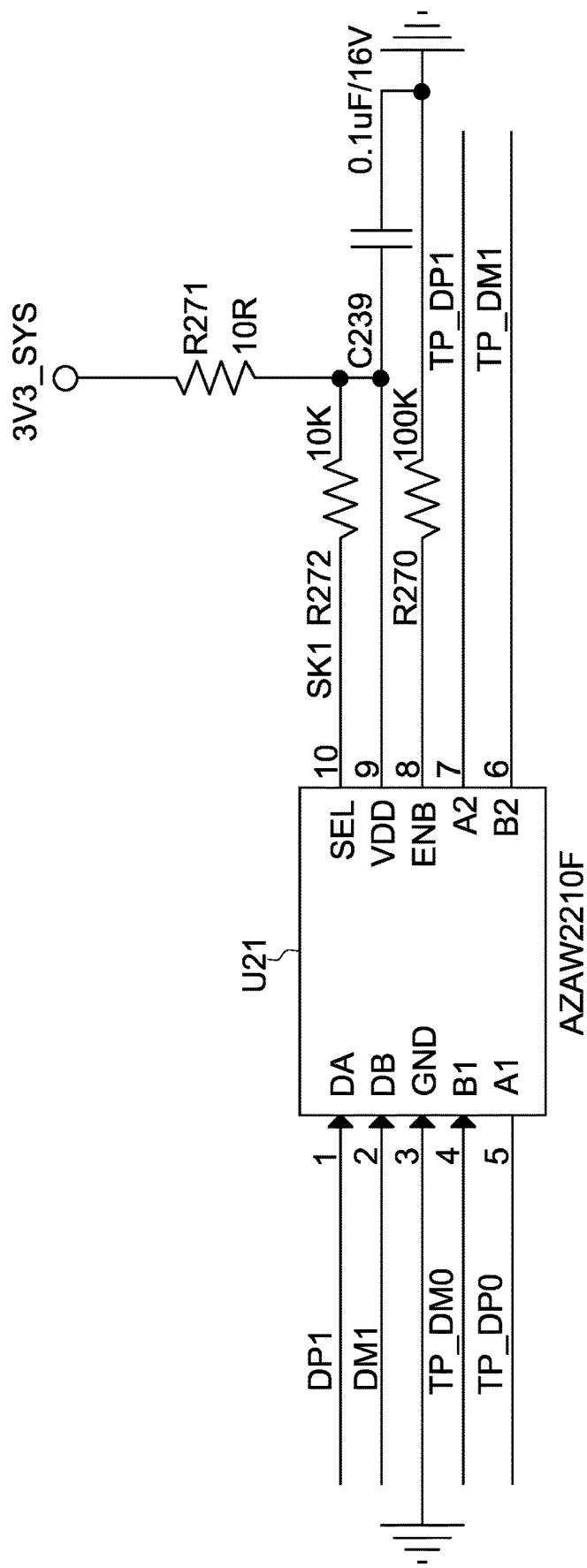
FIG. 12 is a pin connection diagram of a USB port switch.
Figure 13:
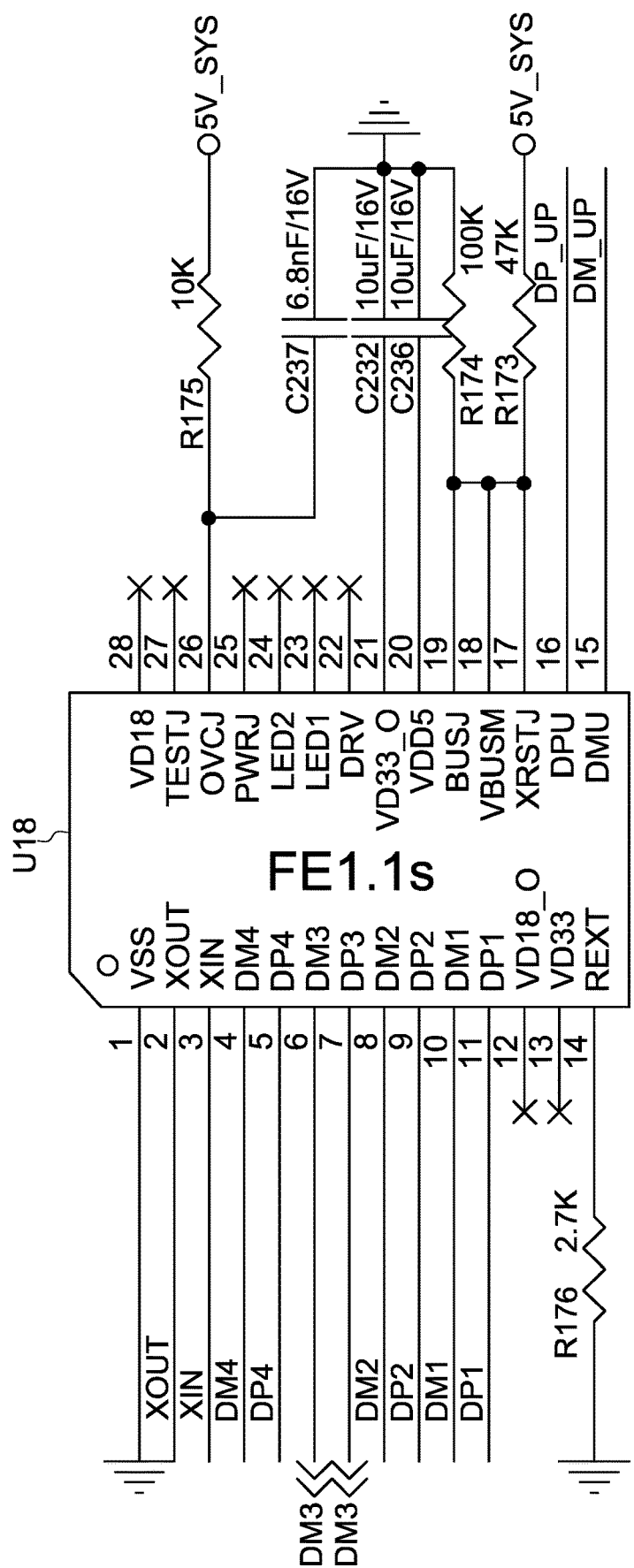
FIG. 13 is a pin connection diagram of a USB HUB chip.
Figure 14:
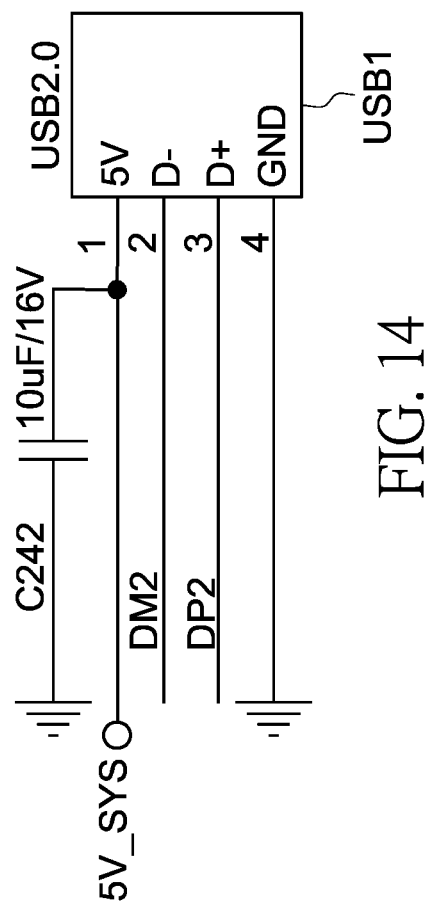
FIG. 14 is a pin connection diagram of a USB interface.

As shown in FIGS. 1-14, a display driver board with multiple TYPE-C full-function interfaces includes a first TYPE-C interface and a second TYPE-C interface, where the first TYPE-C interface and the second TYPE-C interface are both Type C-Mid-Mount SMT in model; signal input ends of the first TYPE-C interface and the second TYPE-C interface are connected to signal output ends of a first connection device and a second connection device, respectively; power ends of the first TYPE-C interface and the second TYPE-C interface are bidirectionally connected to a PD power control circuit, and the PD power control circuit is bidirectionally connected to a system power supply through a DC-DC converter; a control signal input end of the PD power control circuit is connected to a control signal output end of a protocol chip; the protocol chip is LDR6023 in model; a CC signal connection end of the protocol chip is connected to CC signal connection ends of the first TYPE-C interface and the second TYPE-C interface through a communication control circuit, respectively; USB2.0 signal ends of the first TYPE-C interface and the second TYPE-C interface are bidirectionally connected to a signal input end of a USB port switch; the USB port switch is AZAW2210F in model; a signal output end of the USB port switch is connected to a plurality of USB interfaces through a USB HUB chip; the USB interface is configured to connect a data connection product such as a keyboard and a mouse; the USB HUB chip is FE1.1S in model; output signal ends of the first TYPE-C interface and the second TYPE-C interface are connected to signal input ends of a first SWITCH chip and a second SWITCH chip, respectively; the first SWITCH chip and the second SWITCH chip are SWITCH460S in model; signal output ends of the first SWITCH chip and the second SWITCH chip are connected to a display signal processing circuit; a forward/reverse insertion control signal output end of the protocol chip is connected to forward/reverse insertion control signal input ends of the first SWITCH chip and the second SWITCH chip, respectively; and a selection control signal output end of the protocol chip is connected to a signal input end of the USB port switch.

The PD power control circuit includes a first MOS transistor Q13 and a second MOS transistor Q12; a gate of the first MOS transistor Q13 is connected to one end of a resistor R33, and the other end of the resistor R33 is connected to a TYPEC0_VBUS terminal of the first TYPE-C interface; a gate of the second MOS transistor Q12 is connected to one end of a resistor R256, and the other end of the resistor R256 is connected to a TYPEC1_VBUS terminal of the second TYPE-C interface; a drain of the first MOS transistor Q13 is connected to a TYPEC0_VBUS DET terminal and one end of a resistor R254, respectively; a drain of the second MOS transistor Q12 is connected to a TYPEC1_VBUS DET terminal and one end of the resistor R256, respectively; and the other end of the resistor R254 and the other end of the resistor R256 are connected to a power output end 5V SYS of the DC-DC converter; sources of the first MOS transistor Q12 and the second MOS transistor Q13 are grounded, respectively; and the first MOS transistor Q13 and the second MOS transistor Q12 are both 2N7002 in model.

The DC-DC converter employs a buck DC-DC converter TD1583. A SW terminal of the DC-DC converter TD1583 inputs or outputs 5V direct current, and a VCC_IN terminal of the DC-DC converter TD1583 is connected to the system power supply.

The communication control circuit includes a third MOS transistor and a fourth MOS transistor; drain terminals D1, D2, D3, and D4 of the third MOS transistor are connected to the TYPEC0_VBUS terminal of the first TYPE-C interface, drain terminals D1, D2, D3, and D4 of the fourth MOS transistor are connected to the TYPEC1_VBUS terminal of the second TYPE-C interface, and the third MOS transistor and the fourth MOS transistor are both 9435 in model.

The display signal processing circuit includes a first display signal processing circuit and a second display signal processing circuit; the first display signal processing circuit includes a first capacitor C134 and a second capacitor C135; one end of the first capacitor C134 is connected to an AUXP-0 terminal of the first SWITCH chip, one end of a resistor R212, and one end of a resistor R913, respectively, and the other end of the first capacitor C134 is connected to an AUX-CHP-0 terminal of a display screen; the other end of the resistor R212 is connected to a 3V3-SYS terminal of the first SWITCH chip, and the other end of the resistor R913 is connected to a DP-SINK-ASS-P0 terminal of the display screen; one end of the second capacitor C135 is connected to an AUXN-0 terminal of the first SWITCH chip, one end of a resistor R221, and one end of a resistor R211, respectively, and the other end of the second capacitor C135 is connected to an AUX-CHN-0 terminal of the display screen; the other end of the resistor R221 is grounded, and the other end of the resistor R211 is connected to a DP-SINK-ASS-NO terminal of the display screen; the second display signal processing circuit includes a third capacitor C141 and a fourth capacitor C142; one end of the third capacitor C141 is connected to an AUXP-1 terminal of the second SWITCH chip, one end of a resistor R245, and one end of the resistor R244, respectively, and the other end of the third capacitor C141 is connected to an AUX-CHP-1 terminal of the display screen; the other end of the resistor R245 is connected to a 3V3-SYS terminal of the second SWITCH chip, and the other end of the resistor R244 is connected to a DP-SINK-ASS-P1 terminal of the display screen; one end of the fourth capacitor C142 is connected to an AUXN-1 terminal of the second SWITCH chip, one end of a resistor R246, and one end of a resistor R243, respectively, and the other end of the fourth capacitor C142 is connected to an AUX-CHN-1 terminal of the display screen; and the other end of the resistor R246 is grounded, and the other end of the resistor R243 is connected to a DP-SINK-ASS-N1 terminal of the display screen. The display screens of mobile phones, televisions, or tablet computers can use the display driver board.

The TYPE-C interface provides up to 100 w power supply; and USB2.0/USB3.0 exists at the same time, supports forward/reverse insertion, and can transmit video signals (affecting the function of USB3.0). The TYPE-C interface is applied to the field of display by using hardware pins of the USB3.0 to transmit a display signal while using the VBUS power supply to supply power.

The present invention has two full-function USB-C (TYPE-C) interfaces, including a power supply, protocol communication, USB2.0, and video signals, and functions of the two signal interfaces are identical.

Description of Workflow:

A device (a computer, a mobile phone, or a tablet computer) is connected to one of the TYPE-C interfaces. First, VBUS provides a basic power supply to supply power for the protocol chip, the protocol chip is in power capability communication with the device to request for the power supply, and the device provides power to the display screen and controls the USB port switch so that a USB port of the device (the computer, the mobile phone, or the tablet computer) serves as the "uplink port" (the host). The display driver board of the present invention has a USB-HUB (i.e., a USB serial port chip), which can support simultaneous connection of multiple USB devices, and meanwhile, the device reads an EDID of the display screen to know the display capability that the display screen can support, and sends a display signal; and the display signal is processed by a Scaler main control (i.e., the display signal processing circuit) to drive the display screen to display. When another identical device is connected, the protocol chip first communicates with the subsequently connected device to know the power input and output capabilities thereof, to determine which device supplies power to the system, and to charge the other device. The USB 2.0 connected subsequently is assigned as a "downlink port" (similar to a keyboard, a mouse, a USB flash disk) interface, which can solve the compatibility problem of the power supply and the USB2.0 device. In this case, when a power supply is connected (or the power supply is first connected, and then the device is connected), if the device inserted subsequently is only a power device, the protocol chip first communicates with the device connected subsequently to know the power output capability thereof, and requests for an appropriate power supply to charge the device that is first connected and supply power to the display screen.

The Switch chip is designed to support the problem of reversed signal display sequence during USB-C forward/reverse insertion. The forward/reverse insertion is detected by the protocol chip, and is informed to the Switch chip.

The USB port switch is used by the protocol chip to control whether the connected device is connected to the "uplink port" or the "downlink port" of the USB-HUB. If the connected device is the power supply, the "downlink port" is connected; and if the connected device is the computer, the mobile phone, or the tablet computer, the "uplink port" is first connected.

The above is description about the working principle, control logic and connection sequence of the dual USB-C display driver board.

The chip pin diagrams and the circuit structure diagrams in FIGS. 2-14 are only used as embodiments, and are not intended to limit the capacitance values and resistance values in the circuit, and similar circuits of other structures can also be used in the technical solution and are also protected.

The two TYPE-C interfaces on the display driver board have the functions of signal reception, data transmission and PD power management. During use, one TYPE-C interface is used for power input, and the other TYPE-C interface is used for data transmission, which is convenient and fast. In addition, during use, when only one of the two TYPE-C interfaces is connected to the connection device, the protocol chip on the display driver board is connected to the connection device through the communication control circuit, and power is taken from the connection device. The display screen does not work if it fails in power taking, and the display screen is turned on if it succeeds in power taking, and is connected to the USB HUB chip by connecting the USB port switch, and multiple USB interfaces for data connection are expanded through the USB HUB chip.

When Two Connection Devices are Connected:

1. the power supply part: the system takes power from the device with strong power output capability and charges the device with weak power supply capacity;

2. the USB2.0 connection part: if the device that is first connected is already the "uplink port", the device that is connected subsequently is the downlink port, and if the device that is first connected does not use the "uplink port", the device that is connected subsequently is connected to the "uplink port"; and 3. the display signal part: the device remains unchanged according to the condition of the device (if the device outputs, display is received, and if the device does not output, no display presents).

The present invention detects different connection devices through the TYPE-C interfaces, so that the display screens of televisions, mobile phones or tablet computers can be powered by the connection device as required, and the connection device with strong power supply capability is preferentially selected, and the device with weak power supply capability is charged, thereby improving the use effect of the present invention and bringing great convenience to people.

What is claimed is:

1. A display driver board with multiple TYPE-C full-function interfaces, comprising a first TYPE-C interface and a second TYPE-C interface, wherein signal input ends of the first TYPE-C interface and the second TYPE-C interface are connected to signal output ends of a first connection device and a second connection device, respectively; power ends of the first TYPE-C interface and the second TYPE-C interface are bidirectionally connected to a PD power control circuit, and the PD power control circuit is bidirectionally connected to a system power supply through a DC-DC converter; a control signal input end of the PD power control circuit is connected to a control signal output end of a protocol chip, and a CC signal connection end of the protocol chip is connected to CC signal connection ends of the first TYPE-C interface and the second TYPE-C interface through a communication control circuit, respectively; USB2.0 signal ends of the first TYPE-C interface and the second TYPE-C interface are bidirectionally connected to a signal input end of a USB port switch, and a signal output end of the USB port switch is connected to a plurality of USB interfaces through a USB HUB chip; output signal ends of the first TYPE-C interface and the second TYPE-C interface are connected to signal input ends of a first SWITCH chip and a second SWITCH chip, respectively; a signal output end of the first SWITCH chip is connected to a first display signal processing circuit and a signal output end of the second SWITCH chip is connected to a second display signal processing circuit; a forward/reverse insertion control signal output end of the protocol chip is connected to forward/reverse insertion control signal input ends of the first SWITCH chip and the second SWITCH chip, respectively; and a selection control signal output end of the protocol chip is connected to a signal input end of the USB port switch.

2. The display driver board with multiple TYPE-C full-function interfaces according to claim 1, wherein the PD power control circuit comprises a first MOS transistor Q13 and a second MOS transistor Q12; a gate of the first MOS transistor Q13 is connected to one end of a resistor R33, and the other end of the resistor R33 is connected to a TYPEC0_VBUS terminal of the first TYPE-C interface; a gate of the second MOS transistor resistor Q12 is connected to one end of a resistor R256, and the other end of the resistor R256 is connected to a TYPEC1_VBUS terminal of the second TYPE-C interface; a drain of the first MOS transistor Q13 is connected to a TYPEC0_VBUS_DET terminal and one end of a resistor R254, respectively; a drain of the second MOS transistor Q12 is connected to a TYPEC1_VBUS_DET terminal and one end of the resistor R256, respectively; and the other end of the resistor R254 and the other end of the resistor R256 are connected to the DC-DC converter; sources of the first MOS transistor Q12 and the second MOS transistor Q13 are grounded, respectively; and the first MOS transistor Q13 and the second MOS transistor Q12 are both 2N7002 in model.

3. The display driver board with multiple TYPE-C full-function interfaces according to claim 1, wherein the DC-DC converter employs a buck DC-DC converter TD1583, and a SW terminal of the DC-DC converter TD1583 outputs 5V direct current.

4. The display driver board with multiple TYPE-C full-function interfaces according to claim 1, wherein the communication control circuit comprises a third MOS transistor and a fourth MOS transistor; drain terminals D1, D2, D3, and D4 of the third MOS transistor are connected to the TYPEC0_VBUS terminal of the first TYPE-C interface, drain terminals D1, D2, D3, and D4 of the fourth MOS transistor are connected to the TYPEC1_VBUS terminal of the second TYPE-C interface, and the third MOS transistor and the fourth MOS transistor are both 9435 in model.

5. The display driver board with multiple TYPE-C full-function interfaces according to claim 1, wherein the first display signal processing circuit comprises a first capacitor C134 and a second capacitor C135; one end of the first capacitor C134 is connected to an AUXP-0 terminal of the first SWITCH chip, one end of a resistor R212, and one end of a resistor R913, respectively, and the other end of the first capacitor C134 is connected to an AUX-CHP-0terminal of a display screen; the other end of the resistor R212 is connected to a 3V3-SYS terminal of the first SWITCH chip, and the other end of the resistor R913 is connected to a DP-SINK-ASS-P0 terminal of the display screen; one end of the second capacitor C135 is connected to an AUXN-0 terminal of the first SWITCH chip, one end of a resistor R221, and one end of a resistor R211, respectively, and the other end of the second capacitor C135 is connected to an AUX-CHN-0terminal of the display screen; the other end of the resistor R221 is grounded, and the other end of the resistor R211 is connected to a DP-SINK-ASS-N0 terminal of the display screen; the second display signal processing circuit comprises a third capacitor C141 and a fourth capacitor C142; one end of the third capacitor C141 is connected to an AUXP-1 terminal of the second SWITCH chip, one end of a resistor R245, and one end of the resistor R244, respectively, and the other end of the third capacitor C141 is connected to an AUX-CHP-1 terminal of the display screen; the other end of the resistor R245 is connected to a 3V3-SYS terminal of the second SWITCH chip, and the other end of the resistor R244 is connected to a DP-SINK-ASS-P1 terminal of the display screen; one end of the fourth capacitor C142 is connected to an AUXN-1 terminal of the second SWITCH chip, one end of a resistor R246, and one end of a resistor R243, respectively, and the other end of the fourth capacitor C142 is connected to an AUX-CHN-1 terminal of the display screen; and the other end of the resistor R246 is grounded, and the other end of the resistor R243 is connected to a DP-SINK-ASS-N1 terminal of the display screen.

\* \* \* \* \*